United States Patent [19]

Peet, II

[11] Patent Number: 5,361,633

[45] Date of Patent: * Nov. 8, 1994

[54] METHOD AND APPARATUS FOR WIND SPEED AND DIRECTION MEASUREMENT

[75] Inventor: William J. Peet, II, West Allenhurst, N.J.

[73] Assignee: Peet Bros. Company, Inc., West Allenhurst, N.J.

[*] Notice: The portion of the term of this patent subsequent to Aug. 3, 2010 has been disclaimed.

[21] Appl. No.: 59,838

[22] Filed: May 10, 1993

Related U.S. Application Data

[63] Continuation-in-part of Ser. No. 701,795, May 17, 1991, Pat. No. 5,231,876.

[51] Int. Cl.$^5$ .............................................. G01W 1/00
[52] U.S. Cl. ............................. 73/170.08; 73/861.85; 73/1 E
[58] Field of Search ................. 73/3, 170.02, 170.03, 73/170.05, 1 E, 170.08

[56] References Cited

U.S. PATENT DOCUMENTS

| | | |
|---|---|---|
| 685,590 | 10/1901 | Faltermayer et al. |
| 2,600,011 | 6/1952 | MacDonald et al. |
| 2,969,672 | 1/1961 | Sell et al. |
| 3,119,260 | 1/1964 | Karmin |
| 3,282,099 | 11/1966 | Kingman |
| 3,364,740 | 1/1968 | Wong |
| 3,387,491 | 6/1968 | Adams |
| 3,420,101 | 1/1969 | Adams |
| 3,610,039 | 10/1971 | Althouse et al. |
| 3,678,485 | 7/1972 | Jones |
| 3,713,336 | 1/1973 | Bernstein et al. |
| 3,893,337 | 7/1975 | Jones |
| 4,031,754 | 6/1977 | Bedard |
| 4,078,426 | 3/1978 | Casani et al. |
| 4,177,673 | 12/1979 | Krueger |
| 4,548,074 | 10/1985 | Krueter |
| 4,631,958 | 12/1986 | Van Cauwenberghe et al. |
| 4,631,959 | 12/1986 | Motycka |
| 5,231,876 | 8/1993 | Peet, II et al. ............... 73/170.08 |

FOREIGN PATENT DOCUMENTS

970224A 10/1983 U.S.S.R.

Primary Examiner—Richard E. Chilcot, Jr.
Assistant Examiner—R. Biegel
Attorney, Agent, or Firm—Ratner & Prestia

[57] ABSTRACT

An apparatus for measuring wind speed and direction includes: a wind vane having a permanent magnet, an anemometer having a permanent magnet and a ferromagnetic member, and a stationary housing having radially and axially mounted reed switches. As the anemometer spins, the anemometer magnet closes the radially mounted reed switch once per revolution. This produces a signal having a frequency proportional to wind speed. The wind vane magnet rotates around the housing to a point determined by the wind direction, producing enough flux to keep the axially mounted reed switch closed. The ferromagnetic member is interposed between the magnet in the wind vane and the axially mounted reed switch once per revolution. This draws flux away from the axially mounted reed switch, allowing it to open. The result is a second output signal having a phase difference, relative to the first output signal, that depends on the wind direction. The direction of the fluid flow is determined by computing the phase difference. The housing has a mounting assembly including tapered, grooved mounting members, and a locking collar with a circumferential land to engage the grooves. The housing may be mounted at any azimuthal angle. Calibration compensates for the mounting angle.

6 Claims, 6 Drawing Sheets

METHOD AND APPARATUS FOR WIND SPEED AND DIRECTION MEASUREMENT

This application is a continuation-in-part of copending U.S. Patent application Ser. No. 07/701,795, filed May 17, 1991, now U.S. Pat. No. 5,231,876.

FIELD OF THE INVENTION

This invention relates generally to fluid velocity measurement techniques and particularly to measurement of wind speed and direction by a remotely located transducer.

BACKGROUND OF THE INVENTION

Devices for measuring wind velocity have been known for many years. The two most common devices used for this measurement are the wind vane and the anemometer. The wind vane is used to indicate wind direction and typically comprises an asymmetrical marker which is horizontally mounted on a vertical rotating shaft. The bulk of the area of the marker lies on one side of the vertical shaft. The marker is free to rotate so that it assumes a direction parallel to the flow of the surrounding air. The anemometer measures wind speed and typically consists of a plurality of hemispherical cups, each mounted at the end of an arm. The arms are radial members which rotate about a vertical central shaft. The speed of rotation is proportional to the wind speed.

The prior art produced many methods of retrieving electronic measurements of wind velocity from remotely located fluid velocity transducers. U.S. Pat. No. 2,600,011 to MacDonald, et al. features a device for measurement of fluid flow within a pipe or conduit. A twisted vane is mounted inside the pipe so as to rotate around the pipe's longitudinal axis with a speed proportional to fluid flow. A permanent magnet is disposed in a direction parallel to the pipe's longitudinal axis. The magnet is mechanically fixed to the vane with a radial displacement slightly less than the pipe's radius. A reed switch is situated just outside of the pipe, in a direction parallel to the magnet. The reed switch includes a pair of contact members which form a closed circuit path in the absence of substantial magnetic flux from the permanent magnet. When fluid flow actuates the vane, the magnet will periodically rotate to a position near the reed switch, causing the switch to open and close. By measuring the frequency with which the circuit opens, the fluid speed is measured.

U.S. Pat. No. 3,282,099 to Kingman features a wind speed and direction transducer in which a first reference marker is fixed on the rotating member of an anemometer and passes a first sensing means once each revolution. The first sensing means is disposed at a first angular disposition, fixed with respect to the axis of rotation (e.g., directed towards true north), to sense the first reference marker. The delay between successive passes of the first reference marker over the first sensing means provides a measure of wind velocity.

A second reference marker is fixed to a wind vane, and thus is oriented in the direction of the wind azimuth. A second sensing means is provided for sensing coexistence of the first and second reference markers at a single angular position. Circuit means are provided which serve to relate the elapsed time between sensing the first reference marker at the first disposition and at the second angular disposition for comparison to the elapsed time between the sensing of the first reference marker at the first angular position twice in succession. This provides a measure of the angular displacement between the wind azimuth and the fixed first reference marker.

The sensing means is provided by the use of an air dielectric capacitor arranged so that the two plates of the capacitor rotate with respect to one another once per revolution of the transducer. The plates are closely spaced and are formed and positioned so as to provide minimum and maximum capacitance values during each revolution of the transducer about its axis. This periodic variation in capacitance is used to provide an output signal having an amplitude proportional to the speed of rotation.

Kingman also features an alternate embodiment for sensing the speed of rotation in which the anemometer drives a rotating disc. The disc includes a plurality of fingers which pass between the pole pieces of a ringtype or other magnetic core. The core is energized to provide a magnetic flux between its two pole pieces. The fingers are of a highly permeable material so as to cause detectable variations in the magnetic flux field between the pole pieces.

U.S. Pat. No. 3,364,740 to Wong features a wind vane in which there is provided a permanent magnet fixed to rotate about the axis of rotation of the vane, such that the permanent magnet will always align with the direction from which the wind is blowing. A plurality of reed switches are provided in a circle concentric to the permanent magnet. The spacing between the circle of reed switches and the permanent magnet is such that the reed switch facing in the direction of the wind will be actuated by the magnet.

U.S. Pat. No. 3,420,101 to Adams features a wind vane and an anemometer mounted on separate, independently. rotating shafts. The anemometer shaft rotates a disk on which are located two sets of indices. The first set of indices produces a pulse each time an index passes over a fixed pickup, to provide a measure of wind speed. There is a second fixed pickup and also a moveable pickup, attached to the wind vane shaft. A wind direction measuring interval is defined by the coincidence of the second set of indices with the second fixed pickup and the moveable pickup. The number of pulses by the first set of indices during this interval defines the wind direction. In Adams, each pickup includes a small ferrite core energized by high frequency AC current.

U.S. Pat. No. 3,713,336 to Bernstein features a transducer with a reed switch mounted to a rotating shaft upon which is mounted a wind vane, so that the switch points in the same azimuthal direction as the vane. A permanent magnet is fixed to a rotating anemometer shaft concentric to the reed switch, and at the same height as the switch. The reed switch is activated to produce an electrical signal each time the permanent magnet passes the reed switch.

Also positioned in the anemometer is a magnetic field responsive electric device, such as a magnetodiode, which has an electrical characteristic that changes in response to the magnitude and polarity of the magnetic field to which it is exposed. The magnetic field responsive device is connected in an electric circuit which produces a signal proportional to both the magnitude and direction of the earth's magnetic field and also to the speed of rotation of the anemometer.

Both the output signals from the wind vane and the anemometer have frequencies equal to the frequency of rotation of the anemometer. They differ in phase by an amount which is proportional to the angular displacement of the wind vane from a fixed direction (e.g., true north).

U.S. Pat. No. 4,548,074 to Krueter features an apparatus for measuring wind speed and direction comprising two electrical coils which produce respective electrical signals that are utilized to indicate the wind direction, and an anemometer which rotates actuators through signal producing gaps of the coils. The gap of the first coil is defined by a fixed tang, and the gap of the second coil is defined by a movable tang positioned by a wind vane.

SUMMARY OF THE INVENTION

The present invention is a method and apparatus for calibrating and operating a fluid direction sensor, in apparatus for remotely sensing fluid direction. The apparatus includes a fluid direction sensor rotatably mounted on a stationary housing.

The stationary housing is mounted on a fixed object. A data processor is commanded to enter a calibration mode. When the processor is in the calibration mode, it recognizes the next received direction indicating signal as a reference direction. The fluid direction sensor is aligned towards the reference direction. The sensor produces and transmits to the data processor a direction indicating signal having a respective reference value associated with the reference direction.

The processor processes the next received direction indicating signal, to determine a calibration factor. The processor stores the calibration factor. Thereafter, the fluid direction is determined by the processor, based on the calibration factor and the current value of the direction indicating signal.

DETAILED DESCRIPTION

OVERVIEW

Previously, wind velocity apparatus for electronically measuring both speed and direction of wind have employed relatively expensive components, such as coils, potentiometers, magnetodiodes, custom designed air capacitors, or ferrite cores. The present invention provides for measurement of both wind speed and direction using a simplified apparatus, to achieve a low cost of components and ease of assembly not previously attained. In addition, the components used in the present invention are inherently reliable and have a relatively long expected lifetime.

Figure 1:
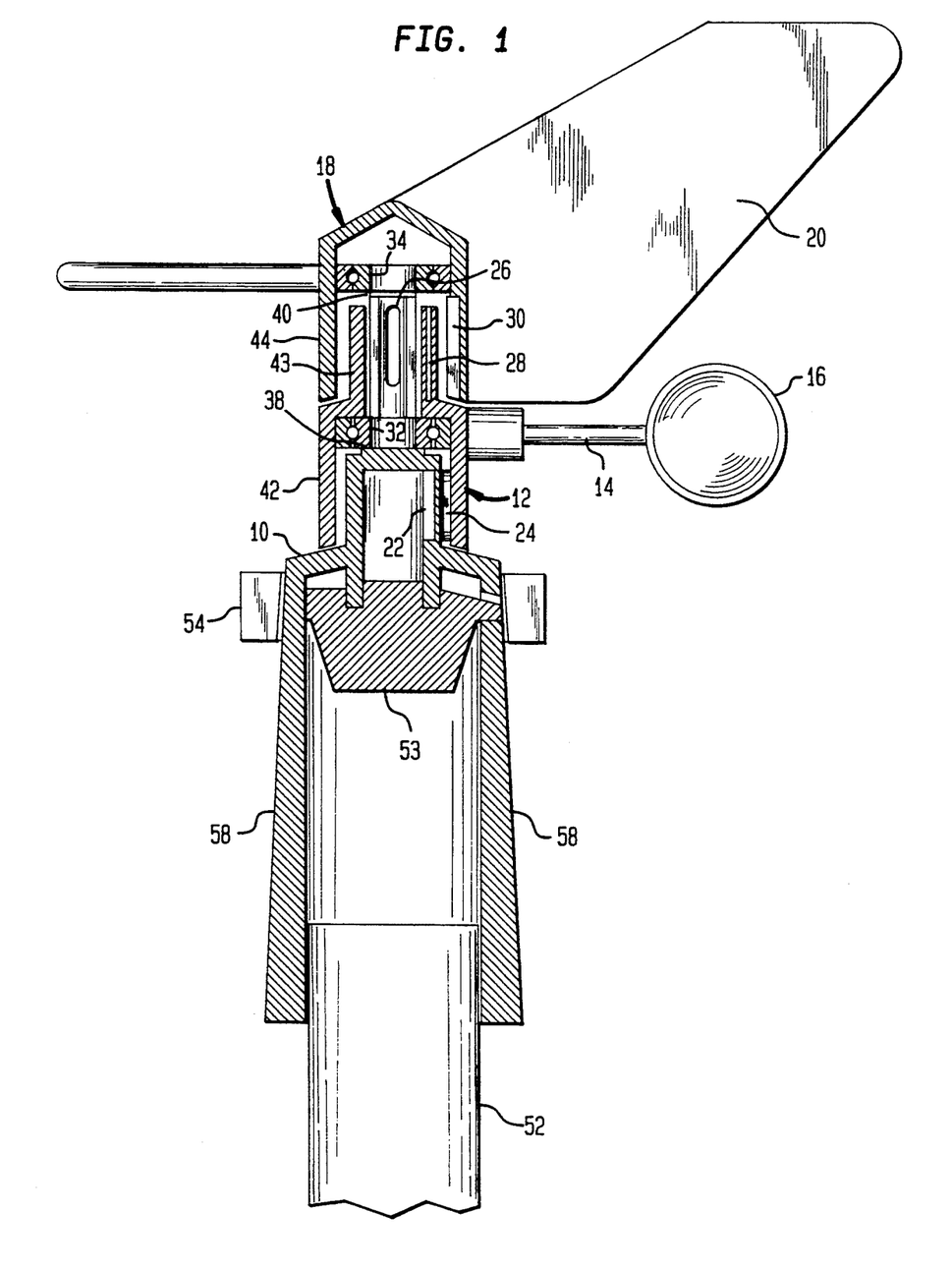
FIG. 1 is a cross sectional view of apparatus which includes an exemplary embodiment of the invention.

FIG. 1 is an elevation view of an exemplary embodiment of the invention. The present invention is embodied in a combined wind speed and direction sensor employing an inner central stationary housing 10, an inner rotating sleeve 12 and an outer rotating sleeve 18 surrounding the inner sleeve 12. The inner sleeve 12 is coupled to conventional anemometer cup arms 16 so that rotation of the inner sleeve 12 is proportional to wind speed. The outer sleeve 18 includes a wind direction vane 20 so that the angular position of the outer sleeve 18 is indicative of wind direction.

Two sensors are employed, both positioned in the stationary housing 10. The anemometer sleeve 12 supports a first source of stimulus 24. The first sensor 22 and the first source of stimulus 24 are positioned such that the first sensor 22 is activated during part of each revolution of the anemometer shaft. The sensor 22 is activated at the same angular position regardless of the wind direction or the angular position of the wind vane sleeve 18.

A second sensor 26 is mounted vertically and is centered within the stationary housing 10. The wind vane sleeve 18 supports a second source of stimulus 30 mounted vertically and proximate to the second sensor 26. In the absence of other effects, the second source of stimulus 30 holds the second sensor 26 in an activated state regardless of the angular orientation of the wind vane sleeve 18. The anemometer sleeve 12 supports a shielding member 28, positioned so that it is interposed between the second sensor 26 and the second source of stimulus 30 during a portion of each rotation of the anemometer sleeve 12. When the shielding member 28 is thus interposed, the stimulus is diverted through the member 30, which decreases the level of stimulus imposed upon the second sensor 26 and allows the second sensor 26 to become deactivated. The angular position of the wind vane sleeve 18 determines when (during each revolution of the anemometer sleeve 12) the second sensor 26 is deactivated.

Two timer circuits 72 and 74 (shown in FIG. 2) are employed to generate signals representing the first interval between consecutive activations of the first sensor 22 and the interval between the activation of the first sensor 22 and the next activation of the second sensor 26. The interval between activations of the first sensor 22 is inversely proportional to wind speed. The ratio of the second interval to the first indicates the phase between a fixed reference direction (e.g., true north) and the wind direction. This ratio is used to determine wind direction.

THE TRANSDUCER SYSTEM

The following is a description of an exemplary wind velocity transducer system in accordance with the present invention.

Figure 1A:
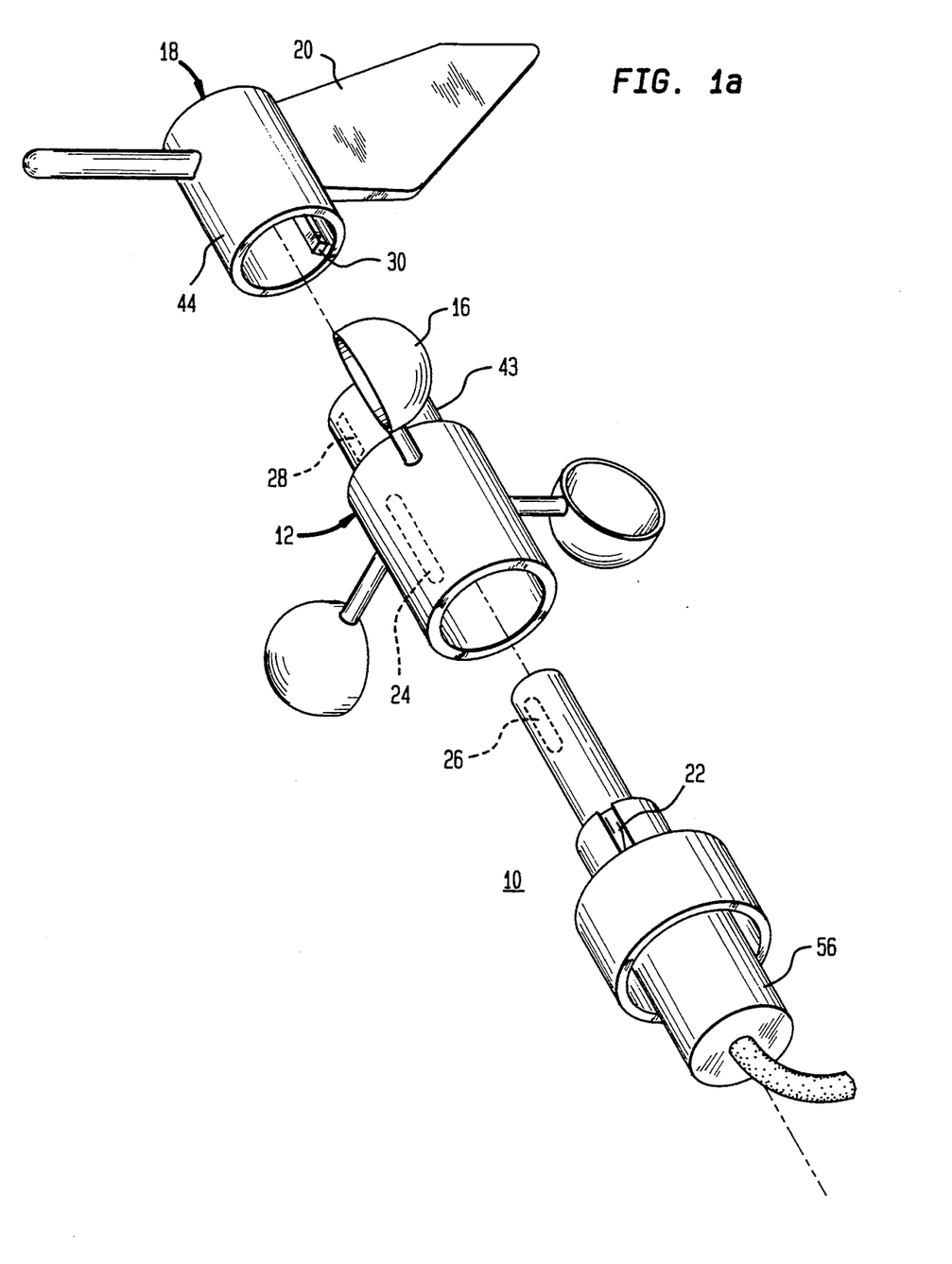
FIG. 1a is a blow up perspective drawing which illustrates the structure of the apparatus shown in FIG. 1.

FIG. 1 shows a cross sectional view of the transducer and FIG. 1a shows a perspective view of the transducer with individual parts separated to illustrate the structure of the transducer. The transducer includes a fixed housing 10 which may be mounted on an elevated structure such as the roof of a residence. Housing 10 includes two shoulders, 38 and 40. Ball bearing 32 is seated with its inner race upon shoulder 38 so that it rotates freely. Sleeve 12 is mounted upon ball bearing 38 and rotates freely with respect to housing 10. Shoulder 40 extends past the top of sleeve 12. Ball bearing 34 is mounted with its inner race on shoulder 40. Sleeve 18 is mounted on ball bearing 34 so that sleeve 18 rotates independently of sleeve 12 and of fixed housing 10. Housing 10, sleeve 12 and sleeve 18 are all molded from glass filled nylon, ABS/PVC composite, or other such material, providing strength and ultra-violet light resistance at a low fabrication cost. Another exemplary material suitable for fabricating these components is a thermoplastic carbonate-linked polymer produced by reacting bisphenol A and phosgene, sold by the General Electric Corporation under the trademark, "LEXAN" ®. Other non-ferromagnetic materials may also be used.

Two conventional reed switches, 22 and 26, are mounted at fixed locations in housing 10. Reed switch 22 is mounted below shoulder 38, so that it is at the same height as the bottom section 42 of sleeve 12. Reed switch 22 is positioned parallel to the longitudinal axis of housing 10, and is situated close to the outer radius of housing 10. Reed switch 26 is mounted above ball bearing 32, between shoulder 38 and shoulder 40, so that it is at the same height as the bottom section 44 of sleeve 18. Reed switch 26 is located along the longitudinal axis of housing 10.

Sleeve 12 is mounted on ball bearing 32. A permanent magnet 24 is installed on the inside of the lower section 42 of sleeve 12, so that the midpoint of magnet 24 is at the same height as the midpoint of reed switch 22. Magnet 24 is oriented parallel to the longitudinal axis of housing 10 and to reed switch 22. The dimensions of housing 10 and sleeve 12, the strength of magnet 24 and the sensitivity of the reed switch are selected so that the reed switch 22 closes during part of each revolution of the sleeve 12, when the angular displacement between the reed switch 22 and the magnet 24 is less than a threshold value. This design task is understood by one skilled in the prior art.

Sleeve 12 supports radial arms 14, at the end of which are mounted conventional hemispherical anemometer cups 16. The arms 14 and cups 16 are fabricated from a lightweight material such as the glass filled nylon or ABS/PVC composite used for sleeve 12. Sleeve 12 also includes a ferromagnetic shield 28 which is positioned in the upper portion 43 of sleeve 12 and oriented parallel to the longitudinal axis of sleeve 12. In the exemplary embodiment of the invention, the shield 28 is a high permeability foil. The foil 28 is situated so that when sleeve 12 is positioned on ball bearing 32, foil 28 is at the same height as reed switch 26.

Sleeve 18 is mounted on ball bearing 34. A permanent magnet 30 is mounted inside of the lower section 44 of sleeve 18, such that magnet 30 is at approximately the same height as reed switch 26 and ferromagnetic foil 28. Sleeve 18 supports a conventional wind vane 20, and rotates freely with respect to housing 10, so that wind vane 20 orients itself parallel to the direction of the wind.

Reed switch 26 and magnet 30 are so selected that, in the absence of the ferromagnetic shield 28, magnet 30 will actuate reed switch 26. Since reed switch 26 lies along the central axis of housing 10, switch closure is independent of the angular displacement of magnet 30. Ferromagnetic foil 28 is designed and located so that, when it is interposed between reed switch 26 and magnet 30, it diverts magnetic flux, decreasing the magnetic field imposed upon the reed switch 26, and switch 26 opens. This occurs whenever the angular displacement between the ferromagnetic foil 28 and the magnet 30 is below a threshold value. While the magnet 30 is relatively static (moving only when the wind direction changes), foil 28 rotates with the same frequency as the anemometer sleeve 12. Reed switch 26 thus opens and closes approximately once per revolution of the sleeve 12.

Figure 2:
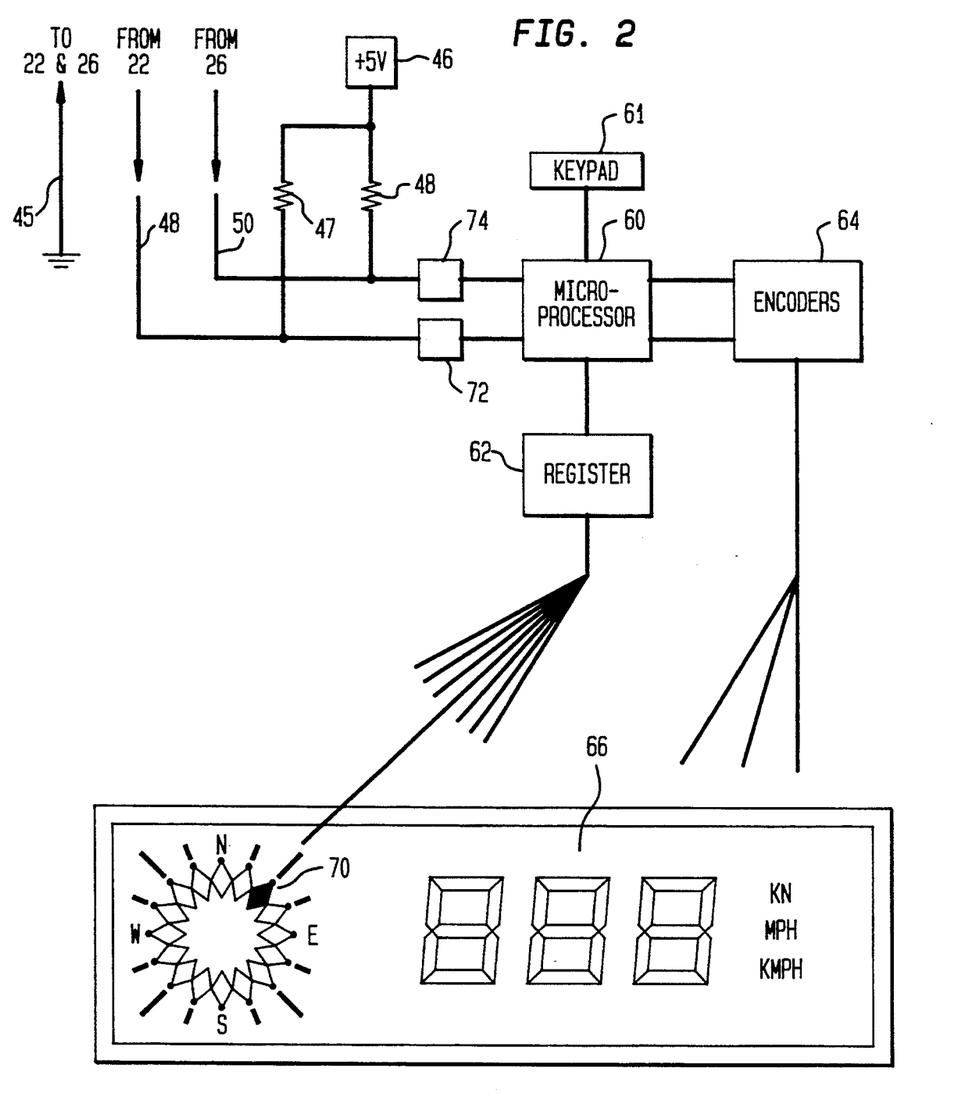
FIG. 2 is a block diagram, partly in schematic diagram form, showing the processing and display components of the apparatus shown in FIG. 1.

Referring to FIG. 2, a block diagram of the apparatus is shown, including the remotely located processing equipment and the display. A source of reference potential (e.g. ground) sinks current from both reed switches 22 and 26 via the connection 45. The respective output connections 48 and 50 from the reed switches 22 and 26 are provided to two timer circuits, 72 and 74. Each of the connections 48 and 50 is coupled to a 5 volt source of operating potential 46 through respective pull-up resistor 47 and 48. In this configuration, when one of the switches is open, the signal on its associated connection is +5 volts. When the switch is closed, this signal drops to approximately ground potential.

Timer circuit 72 generates a pulse signal where each pulse spans the interval between consecutive closures of reed switch 22. This signal is provided to the microprocessor 60 which may, for example, count a number of pulses of an internal clock signal (not shown) occurring during this interval to produce a value T1 which is proportional to the length of time between consecutive closures of the switch 22. Timer circuit 74 produces a pulse signal which is used by the microprocessor 60 in the same manner to measure the interval between the closure of reed switch 26 and the next successive closure of switch 22. This interval is represented by a value T2. The microprocessor 60 computes the ratio of T2:T1 and multiplies the result by 360 degrees to determine the angular displacement between the fixed reed switch 22 and the wind vane 20. Microprocessor 60 also calculates the current wind speed from the value T1. It is contemplated that the functions performed by the timer circuits 72 and 74 may be implemented in software and performed by the microprocessor 60.

Microprocessor 60 is used to filter out extraneous readings of wind speed and direction, whether caused by electrical noise or by abnormal acceleration of sleeve 12 or sleeve 18. Filtering is accomplished by calculating wind speed and wind direction for two successive revolutions of sleeve 12. According to one filtering method, if the two speed calculations differ by more than 20 percent, or if the two direction calculations differ by more than 22.5 degrees, the datum is discarded and new readings are taken.

According to an alternative filtering method, the datum is discarded and new readings are taken if the two speed calculations differ by more than a predetermined threshold value. The threshold is measured in kilometers (or miles) per hour. Using this filtering method, the data may vary by a larger percentage at low speeds without being discarded than the percentage variation at high speeds. An additional filtering method includes two different threshold values. The first value is used at low speeds, and the second value is used at high speeds.

In contrast to prior art wind velocity transducers, the present invention only uses two reed switches and two permanent magnets to provide the signals needed to extract wind speed and direction from a wind vane and anemometer. The present invention allows the use of low impedance circuits having very low levels of interfering noise while maintaining negligible current drain.

A number of convenient displays may be employed along with the transducer described above. FIG. 2 shows the microprocessor 60 providing wind speed values to seven segment encoders 64, which drive a liquid crystal display 66. A convenient display for wind direction is an analog format, such as a compass rose on the same liquid crystal display 66. Within the compass rose are sixteen direction diamonds, 70. Microprocessor 60 provides sixteen bits of data to output driver register 62. Each respective bit determines whether its respective direction diamond 70 is activated. Microprocessor 60 selects the direction diamond 70 which is closest to the actual wind direction and ensures that only one direction diamond at a time is activated.

It is contemplated that wind direction may also be provided by a digital display (not shown) with each bit pattern corresponding to a respectively different pattern of driving signals for a digital display. In this embodiment of the invention, the digital display would include three alpha-numeric display devices (not shown) for displaying, for example NNE, N, NNW, WNW, W, etc. Alternatively, a numeric display device such as LCD 66 may employed to display wind direction in degrees referenced to north.

Although the embodiment discussed above used reed switches to detect changes in the local magnetic field due to rotating magnets affixed to the apparatus, it is possible to accomplish equally good results using a Hall-effect device to measure either wind speed or wind direction. For example, Hall-effect devices could replace either or both of the reed switches 22 and 26 in the described embodiment of the invention. Hall effect devices can measure changes in a magnetic field to an accuracy of about one gauss. They are inexpensive, simple, small and reliable.

It is understood by one skilled in the art that many variations of the embodiments described herein are contemplated. The present invention may be embodied in other apparatus employing wind speed and direction transducers which rotate coaxially about a fixed housing. The transducers may be any of a number of different sensor elements which sense for example electromagnetic or other types of radiation. The transducers are activated by sources of stimulus such as light-emitting diodes or low-level radiation sources such as tritium capsules.

For example, a second embodiment of the invention (not shown) uses the motion of the transducer to change the reluctance of an electromagnet with each rotation, producing a signal whose frequency is proportional to wind speed. A third embodiment (not shown) uses a permanent magnet to induce a voltage spike into a coil with each rotation.

The stimulus need not be an electromagnetic field. A fourth embodiment of the invention (not shown) employs a light source, such as a tritium capsule, as the source of stimulus. The light beam is modulated by the vane which reduces the stimulus sensed by the sensor once per rotation. A fifth embodiment (not shown) uses a radioactive material, such as Americium 241, as a source of stimulus, with an alpha particle damping material mounted on the other rotating transducer.

Although the detailed description of the invention encompasses a design in which the source of stimulus (magnet 30) is displaced further from the axis of rotation than the gain source (foil 28), the invention can also be applied with the stimulus source closer to the axis of rotation. This is a matter of design choice understood by one of ordinary skill in the art, and it applies to various ones of the embodiments discussed herein.

CALIBRATION

Additionally, the microprocessor 60 is programmed to provide a semi-automatic calibration mode for wind direction. This permits housing 10 to be mounted without special regard to its angular orientation. After the housing 10 is fixed in position, the user activates the calibration mode, aligns the wind vane 20 toward a reference direction, and spins the anemometer cups. The reference direction may be north. Alternatively, if the wind is blowing from a known direction, the calibration may be accomplished manually from the keypad 61 using the known wind direction as a reference.

According to the first method, after housing 10 is fixed in position, the user activates the semiautomatic calibration mode. The user then aligns the wind vane 20 toward the reference direction (north), and spins the anemometer cups 16. The sensor produces and transmits a direction indicating signal to the microprocessor 60. When the wind vane 20 is aligned and the cups 16 are spinning, the user causes the direction indicating signal to be transmitted to the data processor 60. When placed in the calibration mode, the processor 60 recognizes the value of the next received direction indicating signal as an indicator of reference direction, as explained in greater detail below.

In the first exemplary method, the cable 182 (shown in FIG. 2) coupling the sensor system to the processor 60 is disconnected before the calibration mode is entered, so that the transmission of the direction indicating signal to processor 60 is interrupted. In the exemplary embodiment, the user enters a key combination on a keypad 61 to activate the calibration mode. After the wind vane 20 is aligned and the cups 16 are spinning, the cable 182 is reconnected. The next received direction signal after reconnecting cable 182 serves two purposes during the calibration. The first purpose of the next received direction signal is to act as a calibration command; i.e., it causes microprocessor 60 to process and store a calibration factor indicative of the reference direction.

The second purpose of the next received direction signal is to provide a reference direction. The value of the next received direction signal is recognized by processor 60 as the value of the reference direction. In the exemplary apparatus, microprocessor 60 is programmed to associate the next received direction indicating signal with the direction north. Microprocessor 60 calculates a calibration factor based on the value of the next received direction signal. The microprocessor 60 stores the calibration factor. The calibration factor represents a fixed angular offset value such that thereafter, when the vane 20 is aligned in that direction, north is displayed. After the calibration, the microprocessor 60 determines the fluid direction based on the calibration factor and the current value of the direction indicating signal.

It is understood by one of ordinary skill in the art that the use of the next received direction indicating signal both as a calibration command and as a reference direction indicating signal is but one example of the invention. Other exemplary embodiments are also envisioned within the scope of the invention. For example, a separate and distinct calibration command signal could be issued to the processor commanding it to use the next received direction indicating signal value to determine the calibration factor. If a separate calibration command signal is provided to the processor, then it is not necessary to disconnect and reconnect the cable 182 during the calibration operation.

In the exemplary embodiment, the calibration factor represents the angular offset between north and a zero reference point (not shown). The location of the zero reference point in the apparatus is not known to the user. The exact location of the zero reference point depends on the sensitivity of reed switches 22 and 26 and the strength of magnets 24 and 30, and may vary between units. The calibration factor is a constant, whose value is determined by the orientation of the housing. Thus, if the zero reference point were aligned to north when the housing is mounted on the pipe, the microprocessor 60 would compute a calibration factor of zero. In the exemplary embodiment, the calibration factor is displayed on the LCD display 66 at the completion of the calibration operation. In the event that the calibration factor is lost during a power failure, the user can re-enter the calibration factor, without actually repeating the calibration operation.

The calibration factor may be measured in any convenient unit for measuring angles. In the exemplary embodiment, the calibration factor is represented within the microprocessor 60 by eight bits, allowing 256 different values for the calibration factor. Thus, the increment for the calibration factor is 360/256 degrees.

The calibration method described above typically is performed by two people: one person located at the wind vane 20 to align the wind vane, and another person inside the building, proximate to the microprocessor 60. Variations of the above method allow the alignment to be performed by one person, either before or after the sensor is mounted. These variations may be more convenient, particularly if the calibration is to be performed by a single person.

The second variation of the calibration method may be performed with the cable 182 plugged into the apparatus. The angle of inner sleeve 12 is temporarily fixed with respect to housing 10, so that the anemometer cups 16 do not spin. This may be easily accomplished, for example, by taping sleeve 12 to housing 10 using a conventional adhesive tape (not shown). An inherent feature of the transducer system described above is that no direction indicating signal is generated while the anemometer cups 16 and sleeve 12 are not spinning. The microprocessor 60 is commanded from the keypad 61 to enter the calibration mode, so that the next received direction indicating signal is associated with the reference direction (north). The apparatus is mounted in position (e.g., with housing 10 mounted on a pipe), with the housing oriented in an arbitrary azimuthal direction. The wind vane 20 is aligned towards north. The anemometer is released. In the exemplary method, this is accomplished by removing the tape that fixes the angle between the wind vane 20 and the housing 10. The anemometer cups 16 begin to spin in the wind, generating the direction indicating signal.

Figure 6:
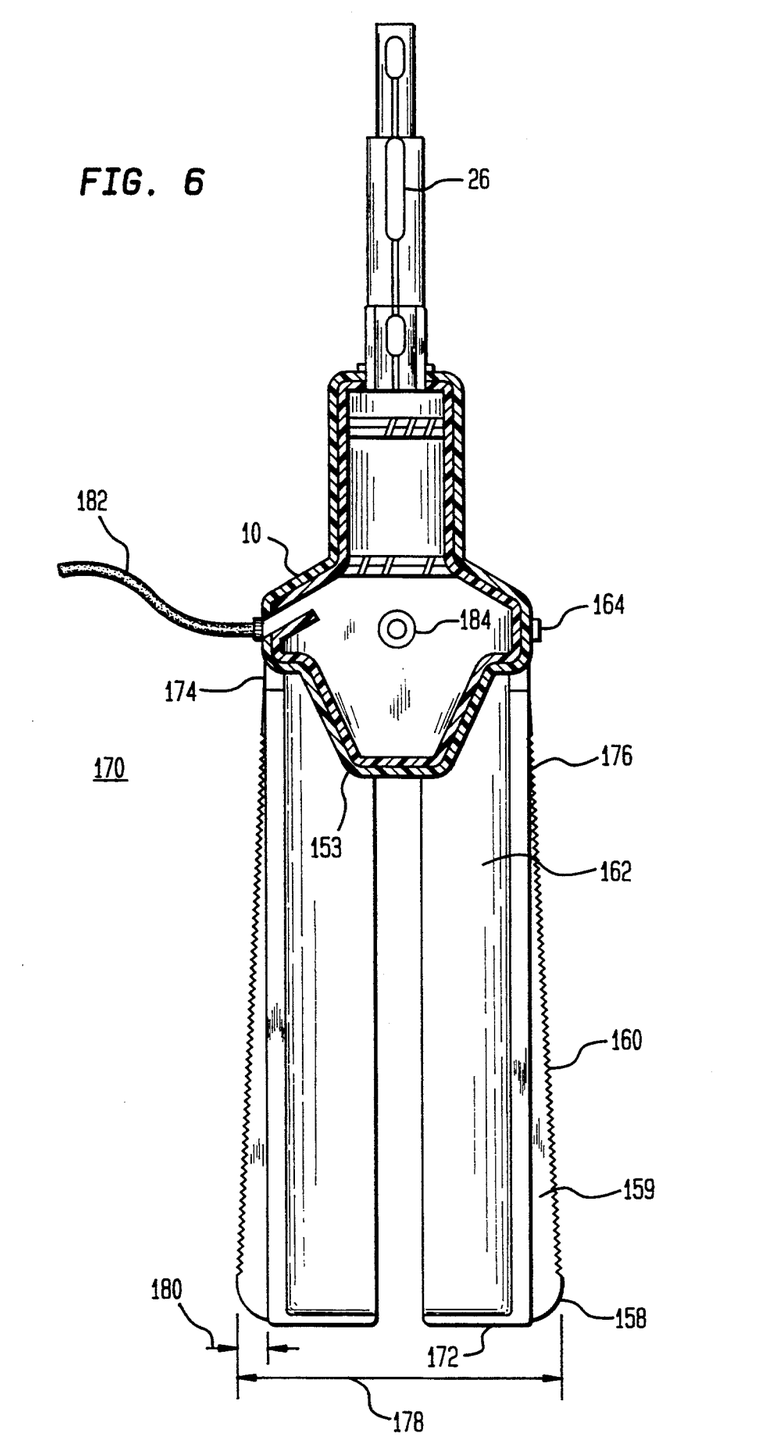
FIG. 6 is a cross sectional view of the housing and mounting assembly shown in FIG. 3.

A third variation of the calibration method may also be performed with the cable 182 plugged into the apparatus. The housing 10 may be oriented in an arbitrary direction. The processor 60 is commanded (e.g., by pressing keys on a keypad 61) to enter the calibration mode. The wind vane 20 is aligned with a marker 184 on housing 10 (shown in FIG. 6). This marker 184 serves as a visual reference, and need not coincide with the magnetic directional reference inherent in the apparatus. The anemometer 12 is spun, generating a direction indicating signal that is associated with the relative angular offset between housing 10 and wind vane 20 when the vane 20 is in alignment with the marker 184. This causes the processor 60 to recognize the next direction signal received as the reference direction (north), regardless of the actual direction of the housing 10 while the calibration is being performed. Processor 60 computes a calibration factor based on the reference direction. The calibration factor so computed has the same value that would be determined if the apparatus were calibrated in situ with the reference marker 184 and wind vane 20 both aligned towards north. The apparatus is then mounted on the pipe or fixed object with the marker 184 directed towards north.

In a fourth alternative method, a single person can perform the calibration operation after the sensor is mounted on the roof (or fixed object), and any known reference wind direction may be used. The reference wind direction value may be retrieved from any source of wind direction data, such as another (previously calibrated) wind vane, or an uncalibrated wind vane in combination with a compass.

By this method, the housing 10 is attached to a fixed object, with an arbitrary azimuthal angle, as in the first method. The calibration may be performed at any time thereafter (However, the wind direction displayed on the compass rose 70 includes a constant offset error until the calibration is performed). To perform the calibration, the known reference wind direction is retrieved and the wind direction determined by processor 60 is read from the compass rose 70. The user subtracts the direction on compass rose 70 from the known reference wind direction. The user then manually adjusts the calibration factor by adding (or subtracting, depending on the direction of the angular offset) the difference to the calibration factor. The adjusted calibration factor is entered by the user and stored by the microprocessor 60. After the calibration, the microprocessor 60 determines the fluid direction based on the adjusted calibration factor and the current value of the direction indicating signal.

A fifth method is a variation of the fourth method described above. The apparatus is mounted on the pipe or fixed object at an arbitrary azimuthal angle, as described above. The calibration is performed subsequently. Instead of computing the angular offset and implementing a single corrective adjustment (as described above), the calibration factor is iteratively adjusted by small increments until the direction value determined by the processor matches the reference wind direction.

The processor computes a new wind direction based on the adjusted calibration factor and the direction indicating signal received from the sensor. The fluid direction is again read from the compass rose 70. The adjusting and reading steps are repeated until the wind direction displayed on the compass rose 70 is substantially equal to the known value. Although this method takes longer than the third method (which only requires a single iteration), this method may be performed without any calculations being performed by the user. For that reason, some users may prefer the iterative method.

MOUNTING ASSEMBLY

In contrast to prior art wind vanes, which typically required a special installation fixture, housing 10 mounts directly atop a conventional one to one-and-one-quarter inch outside diameter television antenna mounting pipe 52. It is understood that the size may be varied to accommodate any range of pipe sizes. Referring again to FIG. 1, fixed housing 10 has a plurality (preferably four) of tapered finger-like projections 58 extending down over the outside of pipe 52. A centering cone 53 is fitted inside housing 10 such that housing 10 will be coaxially aligned as it is pushed down onto pipe 52. Locking collar 54 is then pushed down over the outside of finger-like projections 58, forcing them inward against pipe 52 and locking housing 10 into correct position. With proper design this mounting arrangement can accommodate a reasonable range of pipe diameters.

Figure 3:
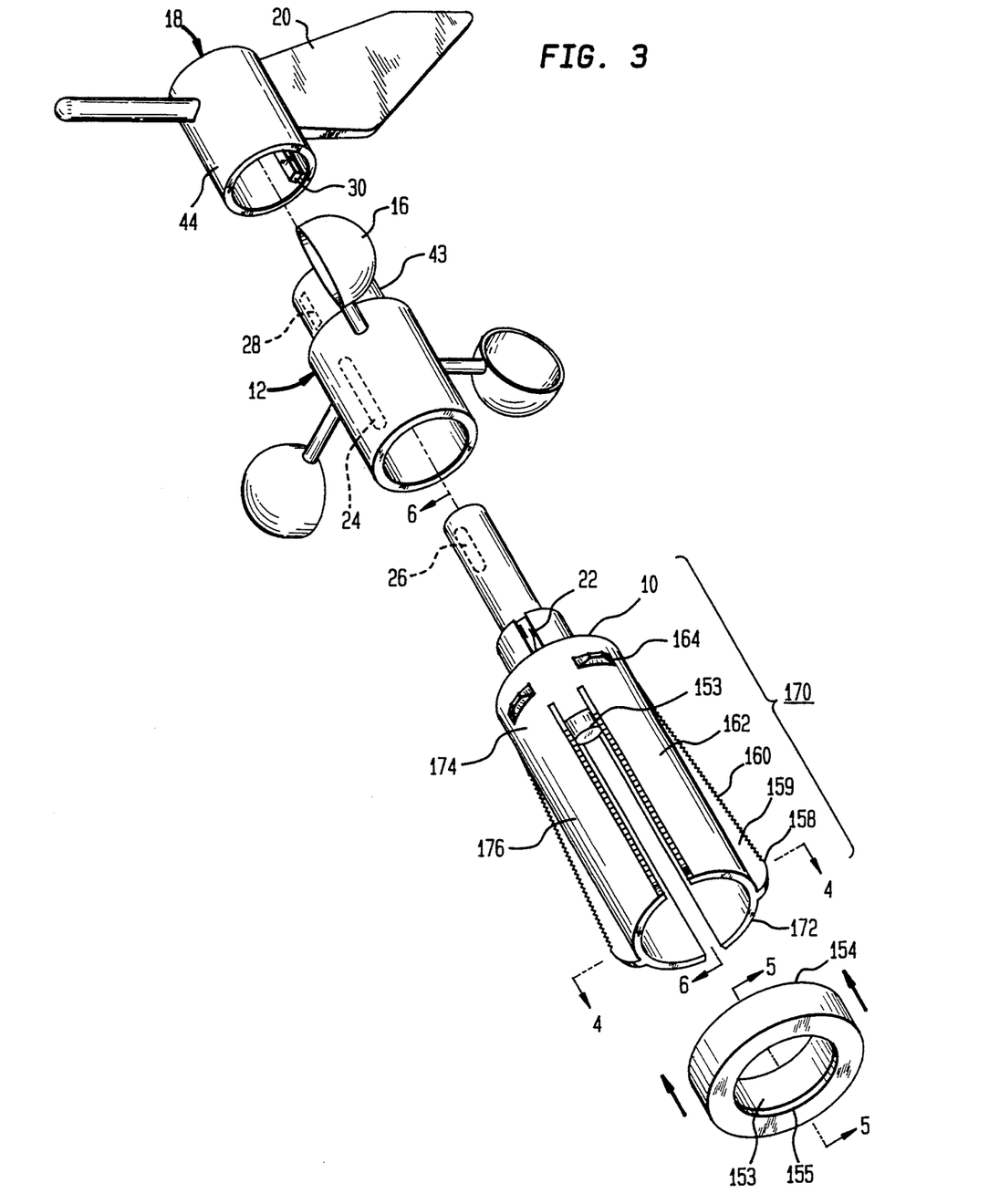
FIG. 3 is an isometric view of a second exemplary embodiment of the invention.

FIG. 3 is an isometric view of the apparatus, including a further exemplary embodiment of the mounting assembly 170. As in the embodiment of FIG. 1, mounting assembly 170 slidably mounts to a pipe (not shown), which may be an antenna mounting pipe or other suitable pipe. The mounting assembly 170 has a bottom end 172 and a top end 174 that is attached to the bottom portion of the housing 10. A plurality of mounting members 176 extend between the top and bottom ends 174 and 172. The mounting assembly 174 has a radial dimension 178 that is greater at the bottom end 172 than at the top end 174.

Each of the mounting members 176 has an inner portion 162 and at least one fin 159 attached to, and extending radially from, the inner portion 162. In the exemplary embodiment of FIG. 3, each mounting member 176 has two fins 159, one on each side. Each of the fins 159 includes an outer edge 158 having a plurality of grooves 160.

Each of the inner portions 162 comprises a part cylindrical shell. The part cylindrical shells are equally sized, and are spaced at equal intervals about a circumference of the housing 10. Each part cylindrical shell has a top end integrally attached to the bottom portion of the housing 10 and an outer surface to which at least one of the radial fins 159 is integrally attached.

Figure 4:
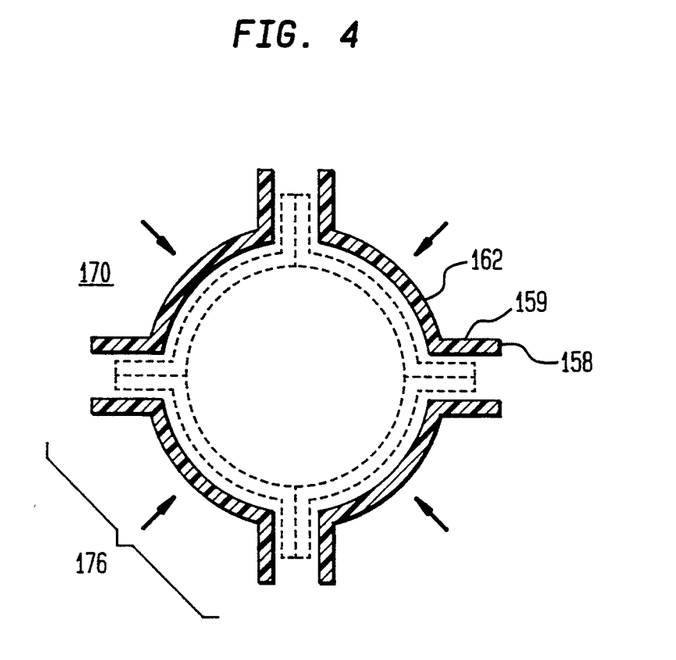
FIG. 4 is a cross sectional view of the mounting assembly shown in FIG. 3.

The exemplary mounting assembly 170 of FIG. 3 has four mounting members 176. Each of the mounting members 176 has an inner portion 162 that subtends an arc of less than 90 degrees. This allows the mounting members 176 to be squeezed together to grip a pipe that has any size within a desired predetermined range. FIG. 4 is a cross sectional view of the mounting assembly 170 shown in FIG. 3. As shown in phantom in FIG. 4, the mounting members 176 may be squeezed together, effectively reducing the radial dimension of the mounting assembly 170. It is understood by one skilled in the art that the number of mounting members 176 is optional, so long as a space is provided between each pair of mounting members to allow the members to be squeezed together.

Figure 5:
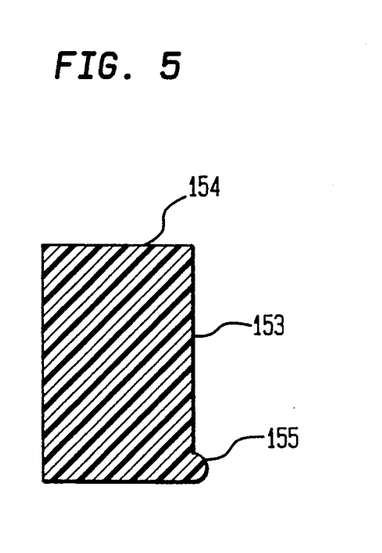
FIG. 5 is a cross sectional view of the locking collar shown in FIG. 3.

Referring again to FIG. 3, a locking collar 154 slidably mounts around the tapered mounting members 176, for compressing the mounting members 176 to grip the pipe. The locking collar 154 includes an inner surface 153. The inner surface 153 has a circumferential land 155 for engaging the grooves 160. Thus, slippage between the collar 154 and the mounting members 176 is prevented. The groove and land combination keeps the collar 154 stabile in high winds, when a combination that includes a smooth collar and smooth mounting members is more likely to become dislodged. FIG. 5 is a cross sectional view of the locking collar 154, showing the land 155 on the inner surface 153.

In order to place the locking collar 154 on the mounting assembly 170, the mounting members 176 are squeezed together into the position shown in phantom in FIG. 4. The locking collar then fits easily over the mounting members 176. A plurality of tabs 164 project radially from the housing 10. The tabs 164 prevent the locking collar 154 from sliding up further and damaging the cable 182 that transmits the sensor output signals to the processor 60 (shown in FIG. 2).

The inventor has determined that the locking collar 154 squeezes the mounting members 176 inward most effectively if the mounting assembly 170 has a radial dimension 178 that increases at an increasing rate towards the bottom end 172 of the mounting assembly 176. This is achieved by providing a fin 159 profile in which the rate of change of the fin height 180 with respect to the distance from the top end 174 is defined by a monotonically increasing function.

Table 1 provides a profile that is used to define the fin 159 profile in the exemplary embodiment of FIG. 3.

TABLE 1

| Fin Profile | |
|---|---|
| distance | height |
| 0.000 | 0.000 |
| 0.100 | 0.002 |
| 0.200 | 0.004 |
| 0.300 | 0.005 |
| 0.400 | 0.007 |
| 0.500 | 0.010 |
| 0.600 | 0.012 |
| 0.700 | 0.015 |
| 0.800 | 0.018 |
| 0.900 | 0.022 |
| 1.000 | 0.026 |
| 1.100 | 0.030 |
| 1.200 | 0.034 |
| 1.300 | 0.039 |
| 1.400 | 0.044 |
| 1.500 | 0.049 |
| 1.600 | 0.054 |
| 1.700 | 0.060 |
| 1.800 | 0.067 |
| 1.900 | 0.073 |
| 2.000 | 0.080 |
| 2.100 | 0.087 |
| 2.200 | 0.094 |
| 2.300 | 0.102 |
| 2.400 | 0.110 |
| 2.500 | 0.118 |
| 2.600 | 0.127 |
| 2.700 | 0.136 |
| 2.800 | 0.145 |
| 2.900 | 0.154 |
| 3.000 | 0.164 |
| 3.100 | 0.174 |
| 3.200 | 0.185 |
| 3.300 | 0.195 |

Note that the units in Table 1 may be inches, or the units may be scaled up or down for a differently sized fin. Using the profile of Table 1, the bottom ends of the mounting members 176 move inward radially by a distance that is substantially proportional to the vertical displacement of the locking collar from the top end 174 of the mounting assembly 170. Thus, a one quarter centimeter displacement of the collar 154 in the vertical direction causes the bottom ends of the mounting members to move inward by a fixed distance, whether the locking collar 154 is near the top end 174 or the bottom end 172 of the mounting assembly.

As in the embodiment of FIG. 1, a centering cone in the form of a conical projection 153 is coupled to the bottom of the stationary housing 10. The centering cone 153 projects downward inside the pipe (not shown), for aligning the housing 10 concentrically with the pipe.

Because the mounting members 176 slide over the outside of the pipe, the mounting assembly 170 may be used to mount the apparatus on hollow pipes that have become obstructed. This provides an advantage over mounting members (not shown) that can only be mounted inside a hollow pipe. Many antenna mounting pipes are obstructed by internally projecting tabs that do not permit internal mounting members to enter the pipe.

It is understood by one skilled in the art that an alternative embodiment (not shown) may be constructed in which more than two fins 159 are attached to each part cylindrical shell 162. Furthermore, in another variation, a rotationally symmetric mounting member having the profile of fin 159 may be used. The exemplary embodiment shown in FIG. 3 provides sufficient strength and gripping ability, using less material than either of these two variations.

While the invention has been described in terms of exemplary embodiments, it is contemplated that it may be practiced as outlined above with modifications within the spirit and scope of the appended claims.

The invention claimed is:

1. In apparatus for remotely sensing fluid direction including a fluid direction sensor rotatably mounted on a stationary housing, a method of calibrating and operating the fluid direction sensor comprising the steps of:
   (a) mounting the stationary housing on a fixed object;
   (b) generating and transmitting a calibration mode signal that causes a data processor to recognize a next received direction indicating signal as a reference direction;
   (c) aligning the fluid direction sensor towards the reference direction;
   (d) causing the sensor to produce and transmit to the data processor a direction indicating signal having a respective reference value associated with the reference direction;
   (e) processing the next received direction indicating signal in the processor, to determine a calibration factor;
   (f) storing the calibration factor; and
   (g) determining the fluid direction based on the calibration factor and the direction indicating signal.

2. A method according to claim 1, wherein step (a) includes mounting the housing at an arbitrary azimuthal angle.

3. A method according to claim 2, further comprising the steps of:
   (h) retrieving a reference fluid direction value from a source of fluid direction data that is separate and distinct from the apparatus;
   (i) subtracting the fluid direction determined in step (g) from the reference fluid direction value to determine the azimuthal angle;
   (j) adjusting the calibration factor by an amount that is determined by the azimuthal angle.

4. A method according to claim 1, wherein the reference direction has a known value, further comprising the steps of:
   (k) adjusting the calibration factor;
   (l) determining the fluid direction based on the adjusted calibration factor and the direction indicating signal; and
   (m) repeating steps (k) and (l), if the fluid direction is not substantially equal to the known value, until the fluid direction determined in step (l) is substantially equal to the known value.

5. A method according to claim 1, wherein the apparatus includes a plurality of mounting members, attached to a bottom portion of the housing and extending downward therefrom, and step (a) includes the steps of:
   (1) sliding the plurality of mounting members that are attached to the housing over the pole, so that the members surround the pole; and
   (2) sliding a locking collar downward over the mounting members, to squeeze the members together to grip the pole.

6. A method according to claim 5, wherein each mounting member includes an outer edge having a plurality of grooves, and the locking collar includes an inner surface having a circumferential land, and wherein step (2) includes the step of:
   engaging the land and the grooves to prevent slippage between the collar and the members.

* * * * *